United States Patent [19]

Visentini

[11] Patent Number: 5,044,229
[45] Date of Patent: Sep. 3, 1991

[54] DIFFERENTIAL GEAR MECHANISM FOR MOTOR VEHICLES

[75] Inventor: Ivano Visentini, S. Maria di Sala, Italy

[73] Assignee: Carraro S.p.A., Italy

[21] Appl. No.: 440,534

[22] Filed: Nov. 22, 1989

[30] Foreign Application Priority Data

Nov. 22, 1988 [IT] Italy ............................ 22685 A/88

[51] Int. Cl.[5] ............................................ F16H 35/04
[52] U.S. Cl. .................................................... 74/650
[58] Field of Search .................. 74/650, 665 F, 665 R

[56] References Cited

U.S. PATENT DOCUMENTS

| | | | |
|---|---|---|---|
| 1,250,700 | 12/1917 | Bunyan | 74/650 |
| 1,414,126 | 4/1922 | Harris | 74/650 |
| 1,498,279 | 6/1924 | Hulett | 74/650 |
| 2,481,066 | 9/1949 | Bagge | 74/650 |
| 4,009,846 | 3/1977 | Coruzzi | 74/665 R |

Primary Examiner—Allan D. Herrmann
Assistant Examiner—Ryan W. Massey
Attorney, Agent, or Firm—Sughrue, Mion, Zinn Macpeak & Seas

[57] ABSTRACT

A differential gear mechanism for motor vehicles, which is effective as well as quite simple construction-wise and low in production cost, comprises a differential gear case made rotatively rigid with a ring gear, a tubular body mounted within the case with a predetermined amount of angular backlash and being rotated thereby, two coaxially aligned sleeves attached to the ends of respective axle shafts and fitting rotatably within the tubular body, and for each sleeve, two freewheel devices arranged to alternately act between the tubular body and the sleeve and a change-over mechanism for activating either of the freewheel devices according to the running direction, in forward or reverse gear.

11 Claims, 3 Drawing Sheets

DIFFERENTIAL GEAR MECHANISM FOR MOTOR VEHICLES

BACKGROUND OF THE INVENTION

This invention relates to a differential gear mechanism for motor vehicles, in particular agricultural tractors, intended to drive rotatively two axle shafts of a motor vehicle live axle.

As is known, in the field of motor vehicles and specifically of four-wheel drive agricultural tractors, torque must be transmitted to both front axle wheels even when under poor and different traction conditions.

Conventional differential gear mechanisms using a planetary or the like system, are designed to apportion the drive torque according to a predetermined ratio; the front axle wheels can therefore be driven at different rotational speeds related to each other.

This differential gear design is only effective where the live axle wheels are subjected to equal traction conditions, because if either slips while the other grips, the speed of the slipping wheel may continue to increase, whereas the speed of the gripping wheel may decrease continuosly until the motor vehicle is brought to a stop.

Several solutions to the problem have been proposed whereby the differential gear can be locked using either positive or friction clutches, either in a fully automatic or manually operated fashion, to provide full or partial locking of the differential gear.

Some examples of differential gear mechanisms are described in U.S. Pat. Nos. 2,329,059; 2,638,794; 2,830,466 and 3,791,238, wherein the differential gears are conventionally provided with fixing rings which are shiftable angularly between positions of frictional engagement and disengagement relatively to a central driving spider, or planet carrier, to thereby disengage temporarily a clutch associated with an axle shaft turning at a higher speed than the other axle shaft.

A further example of a differential gear is disclosed by U.S. Pat. No. 3,397,593 which has an elastic ring for centering a cam central member relatively to a driving spider. In this differential gear mechanism, the cam central member is centered on the driving spider by control cams arranged on either sides of the central cam.

The above-mentioned differential gear mechanisms, while performing in a generally satisfactory manner, still have too complex a construction, involve high-precision machining of the gears or cams, and are therefore exceedingly expensive.

More differential mechanisms are described in U.S. Pat. Nos. 1,414,126 and No. 1,498,279, which are incorporated hereto for reference.

The mechanism of the former of these references has the significant drawback of excluding the mechanical connection between the axle shafts and the drive input mechanism (bevel pinion and ring bevel gear) of the differential gear when no drive or direct resistance is applied between the said mechanism and the wheels on the corresponding axle. Such a situation may be encountered on a descent, for example, when the driving or resisting torques transferred between the axle shafts and the differential mechanism cancel out in consequence of the vehicle movement due to gravity, or with the vehicle at a standstill. In either case, the differential mechanism would enter the idling condition shown in FIG. 2 of the patent. This is a condition which may represent an evident danger where a brake device, for example, is arranged upstream of the differential mechanism to act on both axle shafts through the differential mechanism. In that case, any drive connection between the brake device and the axle wheels would be cut off. In addition, this known differential mechanism makes ample use of elastic members, which are potentially liable to break or yield, and consequently alter the operational characteristics, and in all cases constitute a costly structural complication.

The mechanism of the latter US reference has, on the other hand, a drawback in that it uses pawls for positive engagement of the axle shafts which are actuated by means of oscillating leaf springs. Once again, the leaf springs are liable to break or yield, and their oscillation, which results in either of the actuated pawls becoming engaged while the other is disengaged, may be hampered by any presence of deposits or metal matter in the socket for the pin around which the oscillation takes place. In addition, the pawls are a one-piece construction.

SUMMARY OF THE INVENTION

The problem that underlies this invention is to provide such a differential gear meachanism as can have constructional and performance features appropriate to overcome the drawbacks with which the cited prior art is beset.

This problem is solved, according to the invention, by a differential gear mechanism according to the invention being characterized in that it comprises a differential gear case, a tubular body mounted within the case and driven rotatively thereby, first and second sleeves structurally independent of and set coaxially with each other, being secured to respective axle shafts and journalled in the tubular body, and at least one freewheel device intervening between each sleeve and the tubular body to rotatively drive its respective sleeve at an angular rate at least equal to the rotational speed of the tubular body.

The features and advantages of a differential gear mechanism according to this invention will become apparent from the following detailed description of a preferred embodiment thereof, given by way of illustration and not of limitation with reference to the accompanying drawings.

DETAILED DESCRIPTION OF THE INVENTION

Figure 1:
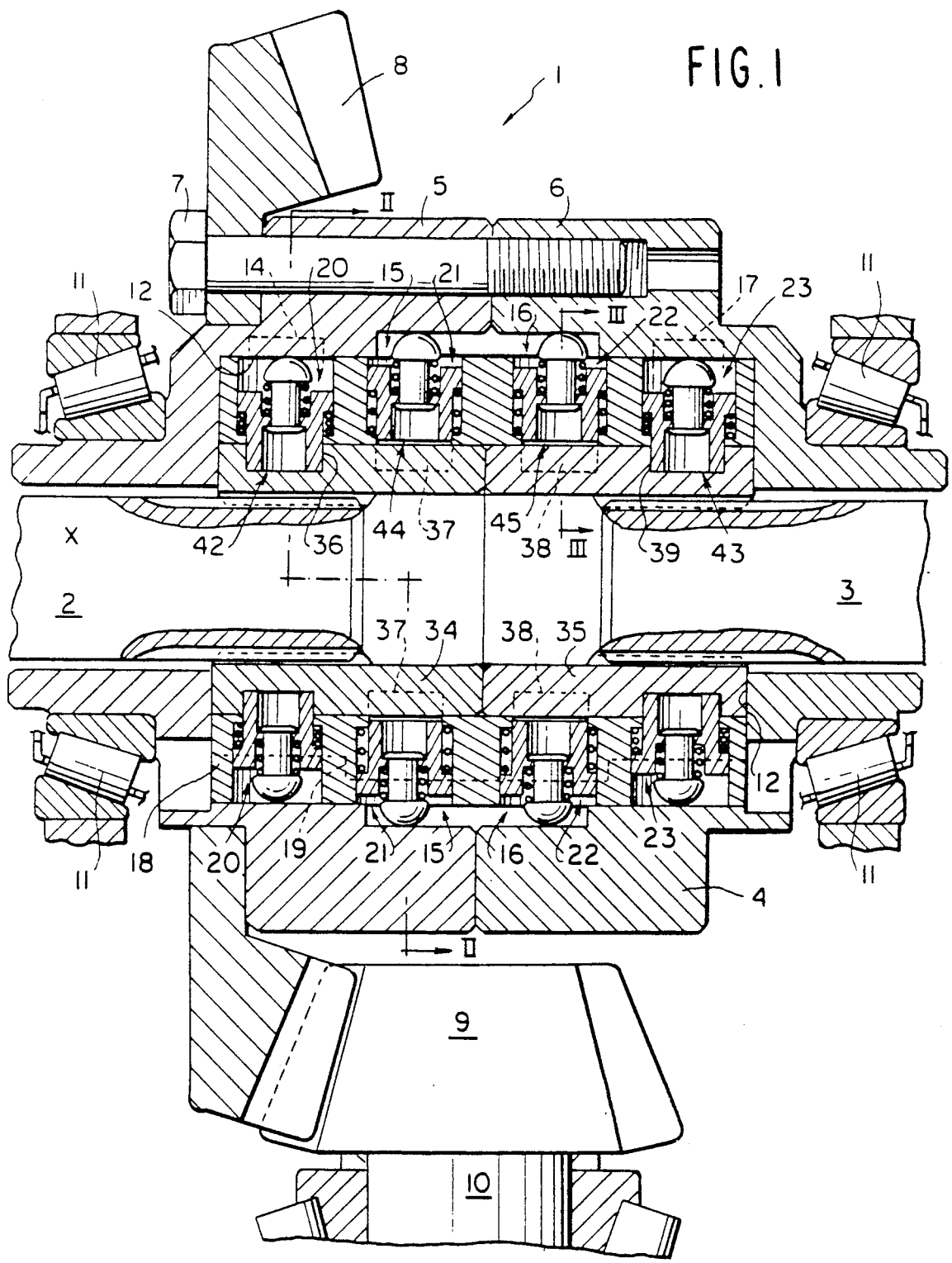
FIG. 1 is an axial section view showing a differential gear mechanism according to the invention.

With reference to the drawing views, generally indicated at 1 is a differential gear mechanism for motor vehicles, in particular agricultural tractors, which is effective to rotatively drive two axle shafts 2, 3 lying along an axis X. Specifically, these are the two axle shafts of the front live axle of the motor vehicle.

The differential gear mechanism 1 comprises a differential gear case 4 lying along the axis X and consisting of two case halves 5, 6 held together by screw fasteners 7. The screws 7 also attach the case 4 to a bevel ring gear 8 adapted to mesh with a pinion gear 9 keyed to a driveshaft 10.

The case 4 is supported rotatably about the axis X inside a differential housing (not shown) by taper bearings 11.

A cylindrical seat 12 is defined within the case 4 which extends along the axis X and is formed with four equidistant longitudinal grooves 13 arranged in mutually facing pairs.

Also formed within the differential gear case 4 are camming means 14, 15, 16, and 17 which consists of four respective sets of four camming notches each. More specifically, in each set 14-17, the notches are arranged to be equidistant at circumferentially pitch intervals on the seat 12. The four notch sets 14-17, moreover, are provided at regular spacings along the axis X on the seat 12 and angularly offset from one another; the first and second notch sets, respectively 14 and 15, are formed on the case half 5, and the third and fourth sets, respectively 16 and 17, are formed on the case half 6.

Figure 2:
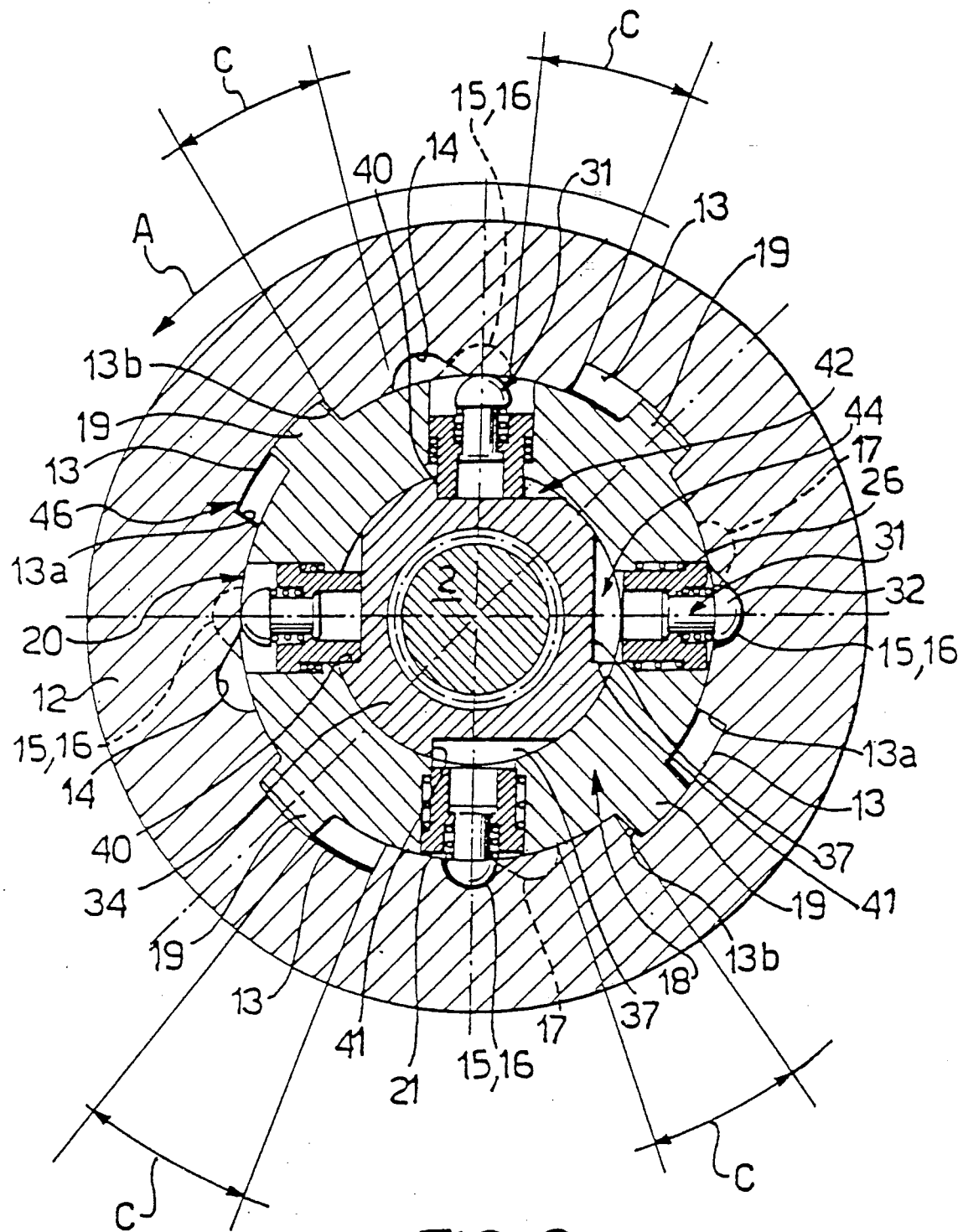
FIG. 2 is a fragmentary section view of the mechanism shown in FIG. 1, taken along the line II—II.
Figure 3:
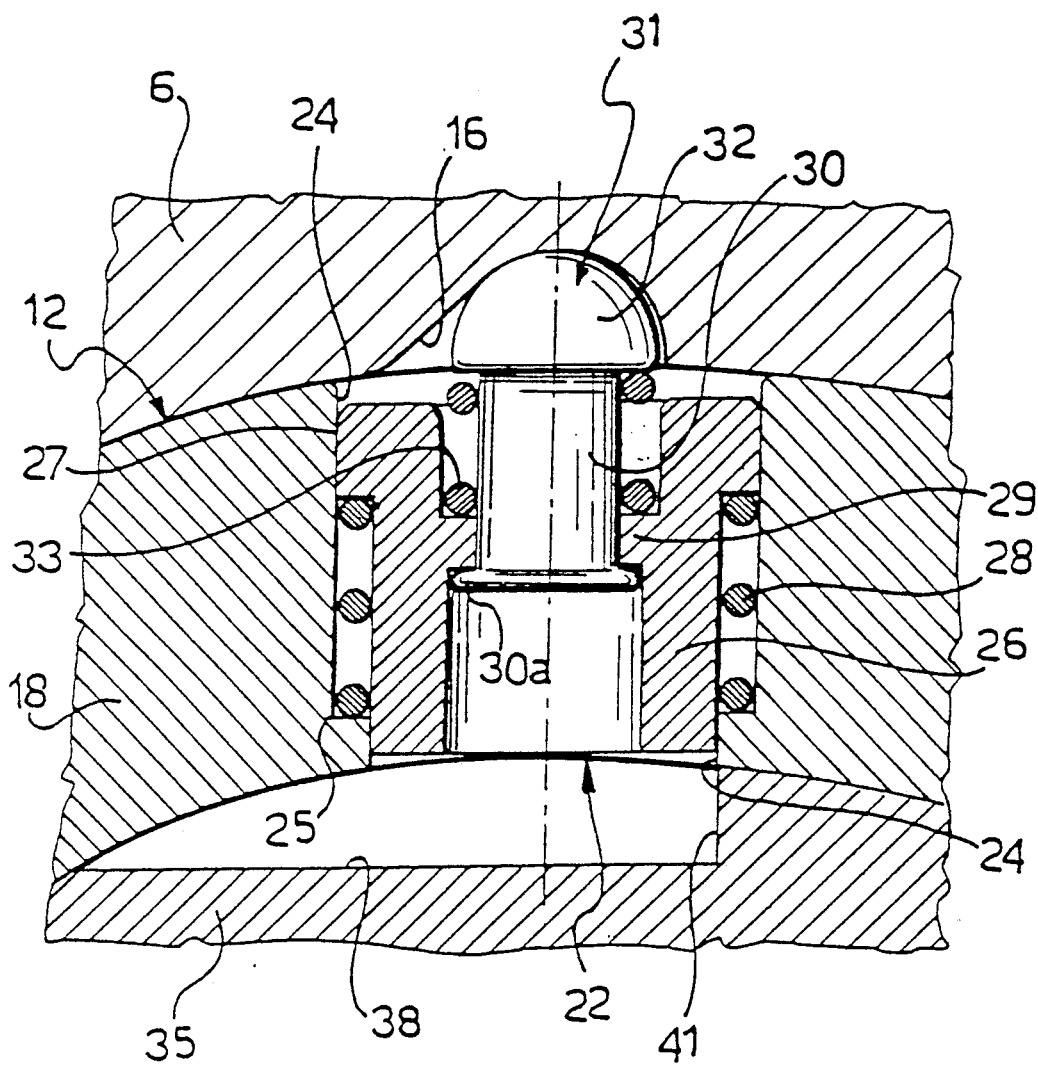
FIG. 3 is an enlarged-scale section view of a detail of the mechanism shown in FIG. 1, taken along the line III—III.

With reference to the forward running direction of the motor vehicle, and therefore to a direction of rotation of the case 4 as indicated at A in FIG. 2, each groove 13 has a longitudinal front side 13a and a a longitudinal rear side 13b defined therein which are parallel to and confront each other.

Also with reference to the aforesaid forward running direction A, the notches in the first set 14 and fourth set 17, i.e. the outermost sets, are located at a selected distance "c" rearwards from their four respective longitudinal grooves 13. The notches in the second 15 and third 16 sets, i.e. the innermost ones, are also located at the distance "c" from their respective grooves 13 but forwardly with respect to the running direction A.

The differential gear mechanism 1 further comprises a tubular body 18 fitting in the seat 12 and being driven rotatively by the case 4 at the same angular velocity as the latter. For this purpose, the tubular body 18 outside is provided with four equidistant dogs 19 extending lengthwise and fitting each into a respective groove 13 with a predetermined angular play to permit of a relative angular displacement between the tubular body 18 and the case 4 on the occurrence of a reversal in the direction of rotation of the case 4, from forward to reverse gear running, and vice versa.

Note should be taken of that the extent of said angular play is substantially equal to the distance "c" of the notch sets 14-17 from the grooves 13.

Circumferentially within the tubular body 18, there are formed four sets 20-23 of four radially throughgoing holes 24 which are distributed at the same pitch distances as said notches; also, each set of holes 20-23 locates at a respective set of the notches 14-17.

Each hole 24 has two diameter dimensions, that is a larger diameter toward the seat 12, and a smaller diameter toward the inside of the tubular body 18; thus, each hole 24 has an annular shoulder 25 defined therein facing outwards from the tubular body.

A respective pawl 26, 31 is fitted slidingly into each hole 24 which is composed of a bush 26 and a feeler 31 to be described. The bush 26 is slidable in its respective hole 24 and provided with a collar 27 at its end on the side of the seat 12. On the bush 26, there is provided a first sprung means 28 comprising a spring, denoted by the same reference, which is mounted between the collar 27 and the annular shoulder 25.

Each bush 26, being formed internally with an annular ridge 29, accommodates the stem 30 slidably therein of a feeler 31 configured as a peg having a rounded head 32 constantly biased toward the seat 12 and the camming means 14-17 formed therein, and dimensioned to fit into the notches.

The free end 30a of the stem 30 is upset behind the annular ridge 29 to prevent the feeler 31 from coming out of the bush 26 completely. In addition, the feeler 31 is provided with a second sprung means 33 consisting of a second spring, as denoted by the same reference, which is mounted between the head 32 and said annular ridge 29.

It should be noted that the second spring 33 is stiffer than the spring 28, so that in pushing the feeler 31 in toward the interior of the tubular body 18, first the spring 28 is compressed to drive partly out the bush 26 toward the interior of the tubular body 18, and then the second spring 33, thereby the bush 26 will be held inside the tubular body 18 with a set preload dependent on the size of the springs 28 and 33 and on the length of the feeler 31. Furthermore, the first sprung means consisting of the spring 28 constantly biases the bush 26 to a position of full retraction into its respective hole 24 out of sight. The first sprung means 28 and second sprung means 33 further enable the whole pawl 26, 31 to be pressed in elastically in the hole 24, out of sight.

The differential gear mechanism 1 further comprises two sleeves 34 and 35 which are coaxial with and independent of each other, being keyed to facing ends of the axle shafts 2 and 3, respectively.

The sleeves 34 and 35 are mounted rotatably to abut each other within the tubular body 18.

Formed circumferentially in each sleeve 34, 35 are two sets 36, 37 and 38, 39 comprising four recesses each; each set defines a substantially sawtooth-like profile at a respective set 20-23 of holes 24.

In particular the sawtooth profiles of the recess sets 36 of the first sleeve 34, and 39 of the second sleeve 35, which sets locate more outwardly at the sets 20 and 24 of holes 25, in turn corresponding with the outward sets of notches 14 and 17, have identical orientations with one another, and a respective longitudinal shoulder 40 is defined in each recess of such sets, which is facing rearwards relatively to the direction A of rotation in forward gear.

The sawtooth profiles of the remaining sets of recesses 37 of the first sleeve 34, and 39 of the second sleeve 35, which are the innermost sets and locate respectively at the sets 21 and 23 of holes 25, in turn corresponding with the inward sets 15 and 16 of notches, are also oriented identically with one another but oppositely with respect to the profiles 36 and 39, and in each recess of such sets there is defined a respective longitudinal shoulder 41 facing forwards relatively to said direction A of rotation in forward gear.

In accordance with this invention, each set 36 (39) of recesses, combined with each set 20 (23) of holes with their respective pawls 26, 31 and first 28 and second 33 sprung means, forms a first freewheel device; in particular, in a preferred embodiment of the invention, that device comprises a first ratchet gear 42 (43) held in releasable engagement between the tubular body 18 and its respective sleeve 34 (35) to rotatively drive the sleeve at a speed no lower than the rotational speed of the tubular body 18 in the forward travel direction A, as explained hereinafter.

Likewise, each set 37 (38) of recesses, combined with each set 21 (22) of holes with their respective pawls, forms a second release device, specifically a second ratchet gear 44 (45) held in releasable engagement between the tubular body 18 and its respective sleeve 34 (35) to rotatively drive the sleeve at a speed no lower than the rotational speed of the tubular body 18 in the opposite direction to the direction A, when running in reverse.

Furthermore, the camming means 14-17 acting on the feelers 31 of the pawls 26, 31, in co-operation with the angular backlash "c" of the dogs 19 in the grooves 13 which involves a relative angular displacement between the case 4 and the tubular body 18, said displacement actuating said camming means 14-17, constitute a change-over means 46 for alternately operating the ratchet gears 42, 43, or 44, 45, when running in forward or reverse gear, respectively.

The operation of the inventive differential gear mechanism according to the invention will be now described.

Under a condition of straight running in forward gear, the ring gear 8 enmeshed with the pinion 9 is rotated by the latter in the direction A at a selected angular velocity "v".

Along with the ring gear 8, the case 4, being rigid therewith, is also rotated in the same direction A.

As in consequence of the rotation of the case 4, the dogs 19 abut against the rear longitudinal sides 13b of the longitudinal grooves 13, the tubular body 18 is entrained by the case 4 to rotate at the same velocity "v" and in the same forward direction A.

Under this condition (see FIGS. 1 and 2), only the pawls 26, 31 of the first ratchet gears 42 and 43, i.e. the outermost ratchet gears, are brought into operation; that is, the feelers 31 of the outward sets 20 and 23 of holes 24 locate at such positions as to be offset from their respective outward sets of notches 14 and 17, wherefore they are urged by the wall of the cylindrical seat 12 inwards of the tubular body 18.

Owing to the related springs 28 and 33 becoming compressed by reason of the pressure force acting on the feelers 31, the bushes 26 of such outward hole sets 20 and 23 will be driven partly out of the tubular body 18 and engage their respective outward recess sets 36 and 39 (see FIG. 2).

In this way, each sleeve 34 and 35, and hence their respective axle shafts 2 and 3, are driven rotatively at a rate no lower than the velocity "v" in the forward direction A. In fact, the ends of the bushes 26, abutting in the respective outward sets of recesses 36 and 39 against the shoulders 40, will force the sleeves to rotate at a rate at least equal to that of the tubular body 18.

As for the pawls 26, 31 of the second or inner ratchet gears 44 and 45, they become disengaged from their related sets of recesses 37 and 38; this is due to such pawls 26, 31 being located at positions which coincides with those of the inward notch sets 15 and 16. In fact, under the action of the sprung means 28 and 33, the heads 32 of the feelers 31 in the inward hole sets 21 and 22 are received in the notches and their related bushes 26 are withdrawn out of sight into the tubular body 18, thereby they will not interfere with the inward recess sets 37 and 38 of the sleeves 34 and 35.

It matters to observe that according to the invention, the sleeves 34 and 35, and hence their respective axle shafts 2 and 3 are advantageously uncoupled from each other.

It follows that, should the wheel of one axle shaft slip, the wheel of the other axle shaft will continued to be rotated at the velocity "v".

When steering to one side in forward gear, with the rotation occurring in the direction A, the situation will be simillar to the previously described one, with the first ratchet gears 42 and 43 operative and the pawls 26, 31 of the second ratchet gears 44 and 45 disengaged from the inward recess sets 37 and 38.

Under this condition, however, the axle shaft of the outer wheel, covering a longer distance than the inner wheel, will be free to rotate at a higher angular velocity than the velocity "v" of the case 4 because its corresponding first ratchet gear, 42 or 43, behaves as a release mechanism. In fact, the sawtooth profiles of the outward recess sets, 36 or 39, will slip over the bushes 26 and compress the second springs 33 between the bushes 36 and the feelers 31, causing the bushes 26 to snap toward the sleeves 34 and 35 each time they meet the recesses.

This situation is maintained until the steering action is over, or until the inner driving wheel rotated at the velocity "v" begins to slip and the outer wheel is forced in turn to drive.

When driving straight in reverse, an opposite situation from that encountered while driving forward straight ahead will occur because the change-over means 46 causes the first ratchet gears 42 and 43 of the sleeves 34 and 35 to become disengaged, while concurrently activating the second inner ratchet gears 44 and 45.

More specifically, this takes place because, on reversal of the running direction, the case 4 is rotated in the opposite direction from A. As a result, following a relative angular movement between the case 4 and the tubular body 18 due to the angular backlash "c", the front longitudinal sides 13a of the longitudinal grooves 13 will abut against the dogs 19 and force the tubular body 18 into concurrent rotation. As a result of that relative angular movement, the feelers 31 of the outward hole sets 20 and 23 will locate at their respective outward notch sets 14 and 17 and, under the urge from the springs 28 and 33, occupy them while allowing their respective bushes 26 to disengage from the outward recess sets 36 and 39 formed in the sleeves 34 and 35.

On the other hand, and again as a result of that movement, the heads 32 of the feelers 31 of the inward hole sets 21 and 22 will move out of their respective inward notch sets 15 and 16, and under the urge from the wall of the cylindrical seat 12, cause the feelers to compress the springs 28 and 33 and force their respective bushes 26 into engagement with the inward recess sets 37 and 38.

The sleeves 34 and 35, and their related axle shafts 2 and 3, are therefore driven rotatively in the opposite direction from the direction A at a rate which is at least the equal of the rotational speed of the ring gear 8.

The same considerations as submitted for the occurrence of slipping and turning in forward gear conditions also apply to conditions of slipping and turning in reverse gear, with the obvious difference that in the latter instance only the second ratchet gears 44 and 45 will be activated.

The differential gear mechanism of this invention is effective in a range of different situations, either while driving in forward or reverse gear, under conditions of poor and different wheel traction, and on turning.

In addition, this differential gear mechanism is structurally simple and suitable for production at comparatively low costs.

We claim:

1. A differential gear mechanism for motor vehicles, in particular agricultural tractors, intended to drive rotatively two axle shafts of a motor vehicle live axle comprising:
   a differential gear case,
   a tubular body mounted within the case for rotation with the case,
   connecting means connecting said tubular body to said case with a predetermined amount of backlash to permit a relative angular displacement between the tubular body and the case on reversal of the direction of rotation of the case,
   first and second sleeves structurally independent of and set coaxially with each other, being secured to respective axle shafts and journalled in the tubular body,
   first and second freewheel devices comprising respective first and second notched gears intervening between each sleeve and the tubular body, respectively to rotatively drive its respective sleeve at an angular rate at least equal to the rotational speed of the tubular body and
   change-over means for alternately operating, for each sleeve, either of the freewheel devices according to the direction of rotation of said case in forward or reverse gear respectively,
   wherein said change-over means comprises camming means formed in the case to act on said first and second ratchet gears, said camming means being operated by said relative angular displacement to disengage the first ratchet gears while concurrently operating the second ratchet gears, or vice versa, according to the direction of rotation of the differential gear case.

2. A differential gear mechanism according to claim 1, wherein each ratchet gear includes at least one pawl fitting slidably in a respective radially through-going hole formed in the tubular body and adapted for engagement with a respective set of recesses each defining a sawtooth profile formed circumferentially around its respective sleeve.

3. A differential gear mechanism according to claim 2, wherein each pawl includes a bush and a feeler biased toward said camming means and being mounted slidably within the bush.

4. A differential gear mechanism according to claim 3, wherein for each pawl, a first sprung means is mounted between the bush and the tubular body to constantly bias the bush away from its corresponding sleeve to a retracted position out of sight into the hole, and a second sprung means between the feeler and the bush.

5. A differential gear mechanism according to claim 4, wherein said second sprung means is stiffer than the first sprung means.

6. A differential gear mechanism according to claim 2, wherein for each sleeve, the sawtooth profile of the first ratchet gear is oriented circumferentially in the opposite direction from the sawtooth profile of the second ratchet gear.

7. A differential gear mechanism according to claim 3, wherein each ratchet gear includes a plurality of pawls provided with respective feelers and being distributed circumferentially around the tubular body inside at identical pitch distances with those of the sets of notches.

8. A differential gear mechanism according to claim 1, wherein said camming means comprises, for each ratchet gear, a respective set of cam-like notches formed circumferentially around the differential gear case inside at pitch distances from one another.

9. A differential gear mechanism according to claim 8, wherein the sets of notches corresponding with said first ratchet gears are angularly offset from the sets of notches corresponding with said second ratchet gears.

10. A differential gear mechanism according to claim 9, wherein the notches of those sets of notches which correspond with the first ratchet gears and the notches of those sets of notches which correspond with the second ratchet gears are arranged at a distance substantially equal to said angular backlash, respectively rearwardly from and forwardly of their respective grooves relatively to a forward gear direction of rotation of the differential gear case.

11. A differential gear mechanism according to claim 1, wherein said tubular body is provided externally with a plurality of dogs engaging, with said predetermined angular backlash, in respective grooves formed in the differential gear case.

* * * * *